United States Patent [19]

Cihon

[11] Patent Number: 5,028,569
[45] Date of Patent: Jul. 2, 1991

[54] CERAMIC ARTICLE, RAW BATCH FORMULATION, AND METHOD

[75] Inventor: John A. Cihon, North Canton, Ohio

[73] Assignee: GTE Products Corporation, Stamford, Conn.

[21] Appl. No.: 208,922

[22] Filed: Jun. 20, 1988

Related U.S. Application Data

[62] Division of Ser. No. 50,837, May 14, 1987, abandoned.

[51] Int. Cl.$^5$ .............................................. C03C 1/00
[52] U.S. Cl. ...................................... 501/32; 264/57
[58] Field of Search ................ 501/32; 65/23; 264/56, 264/57

[56] References Cited

U.S. PATENT DOCUMENTS

| | | | |
|---|---|---|---|
| 188,660 | 3/1877 | Nolan | 501/32 |
| 901,599 | 10/1908 | Eisenlohr | 501/143 |
| 1,136,504 | 4/1920 | Brookfield | 501/32 |
| 1,336,740 | 4/1920 | Gerber | 501/155 |
| 1,374,136 | 4/1921 | Beecher | 501/32 |
| 1,819,686 | 11/1929 | Malinovszky | 501/153 |
| 2,072,460 | 3/1937 | Malinovszky | 106/11 |
| 2,159,349 | 5/1938 | Bennett . | |
| 2,233,575 | 3/1941 | Bair . | |
| 3,423,217 | 1/1969 | Blaha . | |
| 3,847,568 | 11/1974 | Cihon et al. | 51/295 |
| 3,941,604 | 3/1976 | Boyce | 106/39.5 |
| 3,993,495 | 11/1976 | Galliath et al. | 106/40 R |
| 4,074,991 | 2/1978 | Brzozowski et al. | 501/29 |

FOREIGN PATENT DOCUMENTS

| | | |
|---|---|---|
| 53-105520 | 9/1978 | Japan . |
| 57-34047 | 2/1982 | Japan . |
| 59-46701 | 3/1984 | Japan . |
| 351248 | 9/1972 | U.S.S.R. . |
| 814960 | 3/1981 | U.S.S.R. . |

OTHER PUBLICATIONS

Okada et al., "Characterization of Spinel Phase Formed in the Kaolin-Mullite Thermal Sequence", *Communications of the American Ceramic Society*, 69 (10) C251-C253 (1986).

Walters et al., "Effects of Humidity on the Weathering of Glass", *Journal of Non-Crystalline Solids*, 19 (1975) 183-199.

Tichane, R. M., "Initial Stages of the Weathering Process on a Soda-Lime Glass Surface", *Glass Technology*, vol. 7(1), Feb. 1966, pp. 26-29.

"Pre-Reacted Ceramic Body Flux", Announcement of the Bassichis Company, Cleveland, Ohio, 4 pages (date unknown).

D. V. Van Gordon, "Ceramic Science and Engineering Proceedings", vol. 4, No. 11-12, pp. 1056-1066.

*Primary Examiner*—Olik Chaudhuri
*Assistant Examiner*—Andrew Griffis
*Attorney, Agent, or Firm*—Martha A. Finnegan

[57] ABSTRACT

An impervious, virgin soda-lime glass-based ceramic article is disclosed. The impervious ceramic article of the present invention is prepared from a raw batch formulation including virgin soda-lime glass cullet and clay. The article of the present invention has aesthetic and physical properties which are precisely reproducible. A raw batch formulation for making an impervious soda-lime glass-based ceramic article is also disclosed. In a preferred embodiment, the raw batch formulation includes greater than 60 to about 85 weight percent virgin soda-lime glass cullet; from about 15 to about 40 weight percent clay; and from about 0 to about 10 weight percent flint. A method for making an impervious virgin soda-lime glass-based ceramic article is further disclosed. The method comprises dry-mixing a mixture including virgin soda-lime glass cullet and clay to form raw batch material; adding a sufficient amount of a volatilizable liquid to the raw batch material while mixing at a sufficient speed to produce granules of the raw batch material; heating the granules to remove part of the volatilizable liquid therefrom to form partially dried pellets; uniformly distributing the partially dried pellets in a die cavity of predetermined shape; uniformly applying pressure to the uniformly distributed partially dried pellets in the die cavity to form a green body compact; drying the green body compact to a moisture content of less than about 1 weight percent by weight; and firing the dried green body compact to form an impervious virgin soda-lime glass-based ceramic article of predetermined shape.

6 Claims, No Drawings

CERAMIC ARTICLE, RAW BATCH FORMULATION, AND METHOD

This is a divisional of copending application Ser. No. 050,837 filed on May 14, 1987.

TECHNICAL FIELD OF THE INVENTION

This invention relates to ceramics. More particularly, this invention relates to glass-based ceramics.

BACKGROUND OF THE INVENTION

The composition of most impervious ceramics is a mixture of naturally-occurring raw materials such as clays, feldspar, kaolins, talcs, etc. In some instances a small amount (e.g., less than 10%) of man-made "body flux", such as frit, glass cullet, etc., is utilized in the composition. The behavior during processing of these impervious ceramic products and the subsequent fired properties of these products are a result of the variations which characterize naturally-occurring raw materials. The variations in naturally-occurring raw materials also cause color variations from run-to-run. This is experienced, for example, in the manufacture of unglazed, impervious, ceramic tile.

As a result, impervious ceramic articles manufactured using naturally-occurring raw materials are often accompanied by a disclaimer which states that run-to-run shade variation is an inherent characteristic of the ceramic article.

The use of naturally-occurring raw material variations also limits the degree to which the dimensional properties of impervious ceramic articles can be controlled.

In the case of impervious ceramic articles prepared by the dust-pressing method, there are principally three different methods of body preparation heretofore used. "Body materials" is a term of art used to describe the raw tile batch. The first and oldest of these methods includes the steps of: wet-grinding a ceramic raw batch, i.e., grinding the raw batch with a sufficient amount of water (such as 30–40 percent by weight) to form a slurry; filtering the slurry; drying the filter cake to a moisture content of about 6–7 weight percent; breaking the cake into small granules; and then pressing the granules to form the desired shape.

In recent years, a more widely-used method of body preparation has been the process known as spray drying. With this process, the raw batch is first either wet ground or dry ground. The ground raw batch is then mixed with a sufficient amount of water (e.g., about 30–40 weight percent) in a blunging operation to form a slurry. The slurry is screened and then sprayed in small droplet form into a hot air drying tower to evaporate most of the water and provide a flowable mass of small granules having a moisture content of about 6–7 weight percent. These small granules are then pressed to form the desired shape.

The third method of body preparation involves "dry mixing" the batch materials and then adding only that amount of water necessary to permit the formation of granules. After granule formation, the granules are passed through a series of screens for particle (granule) sizing. The sized granules are partially dried in a fluid-bed dryer to form granules having a sufficient moisture content for forming the desired shape by pressing. A moisture content of about 6–7 weight percent is typically used.

When naturally-occurring raw materials are used, as is the case with most commercial ceramic articles made under current practices, each of these three body preparation methods has certain limitations.

The properties of impervious ceramic articles are dependent upon the formation of a glassy phase during the firing process, and upon the reactivity of this glassy phase with other body constituents. With naturally-occurring raw materials, the formation of this glassy phase and its desired reaction with other body constituents is best achieved when body preparation involves the very intimate mixing of all body constituents. This is best accomplished when the constituents are wet-milled or blunged, but the energy requirements to evaporate the amount of water required for these processes is extremely high.

Impervious ceramic particles made by the "dry mix" method from naturally-occurring raw materials do not yield the smooth surfaces normally associated with porcelain-type materials. Instead, the surface has a roughness which is less than desirable because it can (and frequently does) trap dirt, etc.

This surface roughness arises from variations in the amount of and the reactivity of the glassy phase formed during firing. In turn, these variations arise, in part, from the fact that, with naturally-occurring raw materials, the degree of intimate mixing required to ensure glassy phase formation and reaction is very difficult to achieve with the "dry mix" process.

While it is not widely practiced, quantities of ground commercial soda-lime glass cullet, in amounts of 60% or less, have been utilized in ceramic body batches in the manufacture of some tile in order to reduce the temperature at which the ceramic articles are fired.

While this practice permits the substitution of a man-made and theoretically compositionally stable batch constituent for one which is naturally-occurring and compositionally variable, it has not permitted the manufacture of ceramic products which have precisely reproducible aesthetic and physical properties.

SUMMARY OF THE INVENTION

In accordance with the present invention, there is provided an impervious virgin soda-lime glass-based ceramic article of predetermined shape, said impervious ceramic article being prepared from a raw batch formulation comprising virgin soda-lime glass cullet and clay.

In accordance with another aspect of the present invention, there is provided a raw batch formulation for making an impervious virgin soda-lime glass-based ceramic article, said raw batch formulation comprising virgin soda-lime glass cullet and clay.

In a most preferred embodiment, the raw batch formulation includes greater than 60 to about 85 weight percent virgin soda-lime glass cullet, said cullet having an average particle in the range of from about 100 to about 200 mesh; from about 15 to about 40 weight percent clay, said clay having an average particle size in the range of from about 200 to about 325 mesh; and from about 0 to about 10 weight percent flint, said flint having an average particle size in the range of about 100 to about 200 mesh.

In accordance with still another aspect of the present invention there is provided a method for making an impervious virgin soda-lime glass-based ceramic article of predetermined shape. The method comprises dry-mixing a mixture including virgin soda-lime glass cullet and clay to form raw batch material; adding a sufficient amount of a volatilizable liquid to the raw batch material while mixing at a speed sufficient to produce granules of the mixture; heating the granules to remove part of the volatilizable liquid therefrom to form partially dried pellets; uniformly distributing the partially dried pellets in a die cavity of predetermined shape; uniformly applying pressure to the uniformly distributed partially dried pellets in the die cavity to form a green body compact; drying the green body compact to a moisture content of less than about 1 weight percent by weight; and firing the dried green body compact to form said impervious virgin soda-lime glass based ceramic article of predetermined shape.

For a better understanding of the present invention, together with other and further objects, advantages, and capabilities thereof, reference is made to the following disclosure and appended Claims.

DETAILED DESCRIPTION

The present invention is directed to an impervious virgin soda-lime glass-based ceramic article, a raw batch formulation for an impervious virgin soda-lime glass-based ceramic article, and a method for making an impervious virgin soda-lime glass-based ceramic article.

As used herein "impervious" means an article with water absorption of 0.50 percent or less.

The present invention provides impervious virgin glass-based ceramic articles of predetermined shape having aesthetic and physical properties which are precisely reproducible.

Virgin soda-lime glass cullet is cullet which has not been permitted to weather. Weathering occurs when, as a result of exposure to atmospheric moisture, alkalis, most notably sodium, are leached from the glass and migrate to the glass surface.

The use of virgin soda-lime cullet as a major component of the raw batch formulation provides an impervious ceramic article having precisely reproducible color, dimensional stability with respect to length, thickness and width; reproducible strength; and controlled porosity.

As used herein, "virgin soda-lime glass cullet" refers to soda-lime glass cullet which exhibits essentially no alkali ex-solution and essentially no moisture or surface ion adsorption. As used herein, "essentially no" means amounts below those measurable by currently available means of detection.

The use of commercially available soda-lime cullet as a raw material might have been expected to eliminate the types of physical variations in the fired ceramic article experienced when naturally-occurring raw materials are used. The use of commercial soda-lime cullet as a ceramic raw material, however, does not eliminate all of such physical variations. A raw batch formulation utilizing commercial soda-lime cullet as a major component exhibits firing instability which results in fired products which exhibit dimensional variation and nonuniform color.

Advantageously, such firing instability is not experienced when virgin soda-lime glass cullet is used as the predominant ceramic raw material in accordance with the present invention.

The raw batch formulation and the method of the present invention preferably utilize finely-ground virgin soda-lime glass cullet as the major component. The finely-ground virgin soda-lime glass cullet preferably has a nominal particle size ranging from about 100 mesh to about 200 mesh, and most preferably from about 160 mesh to about 200 mesh. Use of soda-lime cullet having a nominal particle size smaller than 200 mesh can create firing instability due to a greatly enhanced glass reactivity in the composition. If the nominal particle size becomes too large, achievement of an intimate raw material blend can be inhibited.

Finely-ground soda-lime glass has a very high free energy on its surface as a result of the number of (free) non-bridging ions created when the glass is fractured during the grinding process. This high surface free energy causes the glass to have a very high affinity for water, which is adsorbed on the fracture surface of the glass.

While not wishing to be bound by theory, it is believed that the strength of the glass-water bond is time and energy dependent. Storage of finely-ground soda-lime glass for relatively short periods of time, e.g., or the energy imparted to the glass during virtually any current practice body preparation operation is believed to result in a glass-water bond having a strength approximating that of chemically combined water. The softening point (approximately 700° C.) of soda-lime glass is relatively close to the temperature at which chemically combined water is released. During the firing process, the surface temperature of a ceramic article is quite frequently greater than the temperature at the interior of the article. When commercially available soda-lime cullet is used as a ceramic batch constituent, this temperature differential is believed to cause the ceramic article surface to seal before all of the combined water in the ceramic body has been released.

Water vapor entrapped in this manner is believed to create the dimensional variation, or distortion, exhibited by a ceramic product prepared from a raw batch material, including commercial soda-lime glass cullet as a major component. Reaction of the water vapor in the commercial cullet at high temperature with ceramic pigments is also believed to create variations in the fired color of the ceramic product.

Similarly, it is believed that this high free energy on the surface of finely ground commercial soda-lime glass cullet sometimes results in the adsorption of carbon dioxide or other substances onto the glass surface. The effects of the adsorption of $CO_2$ and/or other substances by the surface of the glass on firing behavior and on the physical properties of the fired ceramic product are believed to be similar to those described above.

To maintain the virgin soda-lime glass cullet in its non-weathered condition, the process of the present invention requires the raw batch ingredients to be dry ground and dry mixed.

In accordance with a preferred embodiment of the method of the present invention, virgin soda-lime glass cullet, which has not been permitted to weather, is subjected to a dry grinding operation to yield a finely-ground product, having a nominal particle size from about 100 mesh to about 200 mesh (0.150 mm to 0.075 mm).

A variety of devices, such as, for example, fluid energy mills, attrition mills, ball mills, etc. are available to perform this dry grinding operation.

Particle size classification of the dry ground virgin soda-lime glass cullet can be accomplished, for example, either through a screening process or through air classification. Such classification systems are well known to those skilled in the art.

A ceramic body batch is then very precisely weighed. In addition to the finely-ground virgin soda-lime glass cullet, the batch formulation also includes a very pure clay. The body batch may optionally further include flint. Preferably, the flint has a particle size of from about 100 to about 200 mesh.

Examples of clays which can be used in the raw batch formulation include kaolin, (a refractory, white-firing clay with kaolinite as its predominant mineral); shale (a high-iron, illitic clay mixture); and ball clay (a white-to-cream firing, kaolinitic clay which is highly plastic). Preferably the clay has a particle size from about 200 to about 325 mesh.

Use of kaolin permits the manufacture of a very white firing product. To obtain a buff or red firing product, a variety of ball clays or shales can be substituted for a kaolin-flint combination.

Dependent upon the specific properties desired in the final product, the proportions of the various batch constituents can be varied. The amount of virgin soda-lime glass cullet used is preferably greater than 60% to about 85% of the batch by weight; the range for kaolin is from 15% to 40% of the batch by weight; and the range for fine flint is from 0% to 10% of the batch by weight. The inclusion of flint with kaolin permits a greater degree of stability during the firing process.

If a ball clay or shale is used in place of the kaolin-flint combination, the range for this material is from 15% to 40% of the batch by weight.

In order to obtain a final product of a particular color, various ceramic colorants may be added to the batch. These colorants can be in the form of raw oxides or they can be selected from the wide range of ceramic pigments (or stains) available commercially.

After the raw batch ingredients have been thoroughly mixed in a dry state, a quantity of volatilizable liquid is added and a mixing speed is adjusted in a manner such that granules or pellets are formed from the mixture. The amount liquid is an amount sufficient to form granules, or pellets, of the raw batch mixture during mixing. When water is used as the liquid, a preferred amount of water is from about 10 to about 15 weight percent of the raw batch.

The size of the granules or pellets can be varied to produce various aesthetic effects in the final product. If, for example, a monochrome effect is desired in the final product, the best results are obtained when the granules produced have a particle size varying from 0.150 mm to 0.500 mm. If a polychrome, granite-like effect is desired in the final product, larger granules e.g., up to about 3.50 mm diameter, of one or more colors may be mixed into a matrix of a different color having a particle size range identical to that described above.

After the granule-forming operation is completed, the pelletized batch is preferably classified to eliminate oversized or undersized pellets. This can be accomplished, for example, by passing the pellets over a series of vibrating screens. The classified pellets are then partially dried to a residual moisture. A preferred residual moisture content is about 6-7 weight percent. This partial drying step is preferably carried out in a fluid bed dryer. When a fluid bed dryer is used, the classified pellets are fed to the fluid bed dryer by an automatic distributor.

After partial drying, the granules are formed into a predetermined shape by "dry" pressing. The term "dry" pressing means that no moisture is added to the partially dried raw batch pallets before pressing. The pellets which are subjected to the "dry" pressing step do, however, have the above-described residual moisture content.

Optimum dimensional precision of the final ceramic article is achieved by uniformly distributing the partially dried batch granules in the die cavity. Uniformity of cavity fill is important because high shrinkage of the product occurs during the firing process due to the high glass content of the product. A non-uniform distribution of batch materials within the die cavity and, subsequently, within the pressed green body compact can result in nonuniform shrinkage during the firing process.

To ensure maximum uniformity of distribution of batch materials within the die cavity, the present invention preferably utilizes more than one filler box to distribute materials within the die cavity. In accordance with a preferred embodiment of the present invention, two filler boxes are used: one filler box being positioned at the rear of the press and a second filler box located at the front of the press. The addition of a second filler box at the front of the press affords a compensation for the packing action of the shaker box at the rear of the press and a resultant elimination of front-to-back density differentials within the pressed compact.

Because the shrinkage of an impervious ceramic article during the firing process is a function of the porosity remaining in the article after pressing, and because this porosity is a function of forming pressure, optimum dimensional reproducibility of the final product is achieved when uniform forming pressures are maintained throughout this pressing operation. Satisfactory products can be formed using pressures greater than or equal to about 1.0 ton per square inch. Preferably, the pressure is from about 1.0 ton per square inch to about 2.5 tons per square inch. At a pressure below 1 ton per square inch very low green strength is obtained, e.g., the article will break before firing; and the pressed body will contain too much porosity, creating high (and possibly uncontrollable) shrinkage. At a pressure above 2.5 tons per square inch, negligible further densification is obtainable.

After pressing, the product is dried to a moisture content of less than about 1.0% and it is fired to a temperature greater than 1000° C., and preferably Cone 07.

The properties achieved during firing are a function of the reaction of the virgin soda-lime glass with the other body constituents during the firing process and are principally the result of the reaction between the glass and the alumina present in the ball clay, kaolin, or shale. The mechanism of the firing step process of the present invention can be described as reactive liquid sintering.

The ratio of the weight percent of silica in the raw batch mixture to the weight percent of alumina in the raw batch mixture in the raw batch mixture is preferably from about 4.0 to 1 to about 6.5 to 1, and most preferably, about 5.9 to 1. This ratio is dependent upon the oxide compositive of the various raw batch ingredients. In a preferred embodiment the raw batch includes at least 11.0 weight percent $Al_2O_3$ prior to ignition.

Preferably, the virgin soda-lime glass cullet employed in the present invention includes at least about 50 weight percent silica ($SiO_2$). Most preferably, the virgin soda-lime glass cullet includes at least about 50 weight percent silica and minor (e.g., about 3 to about 20 weight percent) amounts each of sodium oxide ($Na_2O$) and calcium oxide (CaO). An example of a most preferred virgin soda-lime glass cullet for use in the present invention includes 60–80% $SiO_2$, 10–20% alkali metal oxide, 5–15% CaO, 2–10% MgO, and less than a total of about 20 weight percent for all of $Al_2O_3$, $Fe_2O_3$, and/or $B_2O_3$.

A more specific example of a most preferred virgin soda-lime glass cullet composition for use as the major raw batch component is:

| Material | Weight % |
|---|---|
| $SiO_2$ | 73.05 |
| $Al_2O_3$ | 1.45 |
| CaO | 5.02 |
| MgO | 3.54 |
| $Na_2O$ | 16.68 |
| $K_2O$ | 0.30 |

An example of an equally most preferred virgin soda-lime glass cullet composition is:

| Material | Weight % |
|---|---|
| $SiO_2$ | 72.62 |
| $Al_2O_3$ | 1.45 |
| CaO | 5.67 |
| MgO | 4.00 |
| $Na_2O$ | 15.99 |
| $K_2O$ | 0.27 |

Composition of typical kaolins or clays include from about 40 to about 60% $SiO_2$, from about 20% to about 40% $Al_2O_3$, with lesser amounts (e.g., less than about 1 weight percent) of each of CaO, MgO, $Na_2O$, $K_2O$, $TiO_2$, $P_2O_5$, $SO_3$, and $Fe_2O_3$.

A preferred kaolin has the composition:

| Material | Weight % |
|---|---|
| $SiO_2$ | 45.16 |
| $Al_2O_3$ | 38.76 |
| CaO | 0.20 |
| MgO | 0.09 |
| $Na_2O$ | 0.10 |
| $Fe_2O_3$ | 0.50 |
| $TiO_2$ | 1.51 |
| $SO_3$ | 0.13 |
| $P_2O_5$ | 0.04 |
| (L.O.I.) Loss on Ignition | 13.40 |

Preferably, flint comprises at least 99 weight percent $SiO_2$.

A most preferred flint composition is:

| Material | Weight % |
|---|---|
| $SiO_2$ | 99.60 |
| $Al_2O_3$ | 0.27 |
| $Fe_2O_3$ | 0.018 |
| $TiO_2$ | 0.028 |
| L.O.I. | 0.10 |

The raw batch formulation and method of the present invention is particularly advantageous when used to make impervious virgin soda-lime glass based ceramic tile, especially tile for use in structural applications, e.g., floor tile.

In the production of impervious ceramic floor tile, a preferred raw batch formulation comprises from 60.33 to 66.67% (by weight) finely-ground virgin soda-lime glass cullet, from about 26.67 to about 33% (by weight) kaolin, and from about 6.66 to about 12.67% (by weight) of fine flint.

When clay is used in place of the kaolin-flint combination, the best results were obtained from a mixture of 66.67% (by weight) of finely-ground soda-lime glass cullet and 33.33% (by weight) of Tennessee ball clay.

Unlike those ceramic tiles manufactured using substantially all naturally-occurring raw materials in which properties and chemical behavior vary, ceramic articles having compositions in accordance with the present invention will have oxide compositions and mineralogical form which can be precisely controlled. Virgin soda-lime glass cullet is the principal batch constituent of articles of the present invention.

Impervious virgin soda-lime glass-based ceramic tile in accordance with the present invention are superior to ceramic tile heretofore available. Tile prepared in accordance with the present invention exhibits run-to-run color uniformity and reproducible dimensional precision. Such characteristics have been heretofore unachievable in commercially available ceramic tiles.

Two compositions, prepared in accordance with the present invention, are described in the following examples.

EXAMPLE I

An impervious soda-lime glass based article in the shape of a floor tile (nominal dimensions 6"×6"×⅜") was prepared following the method steps described below.

More specifically, 24.0 kg of virgin soda-lime glass cullet, 9.6 kg kaolin, and 2.4 kg flint were precisely weighed. One percent (0.36 kg) of an iron-manganese body stain was added for the composition used in this example, but, in the practice of this invention, the relative amount of body stain used would vary according to the specific stain used and according to the color desired in the final product.

The virgin soda-lime glass cullet had the following composition: 73.05 weight percent $SiO_2$; 1.45 weight percent $Al_2O_3$; 5.02 weight percent CaO; 3.54 weight percent MgO; 16.68 weight percent $Na_2O$; and 0.30 weight percent $K_2O$.

The kaolin, Kaolex D6 obtained from J. M. Huber Company, had the following composition: 45.16 weight percent $SiO_2$; 38.76 weight percent $Al_2O_3$; 0.20 weight percent CaO; 0.09 weight percent MgO; 0.01 weight percent $Na_2O$; 0.08 weight percent $K_2O$; 0.50 weight percent $Fe_2O_3$; 1.51 weight percent $TiO_2$; 0.04 weight percent $P_2O_5$; and 15.53 weight percent L.O.I.

The flint, obtained from U.S. Silica, contained: 99.60 weight percent $SiO_2$; 0.27 $Al_2O_3$; 0.018 weight percent $Fe_2O_3$; 0.028 weight percent $TiO_2$; and 0.10 weight percent L.O.I.

The batch ingredients were then transferred to a mixer/pelletizer and mixed for two minutes at high (1600 R.P.M.) rotor speed to ensure a thorough, intimate blend. Ten to 15 weight percent water was added to the dry batch ingredients and the resultant mixture was mixed at 1400 R.P.M. for three minutes to produce granules having particle sizes ranging from 0.150 mm to 0.500 mm. The granules were first passed over a 35 mesh (0.50 mm opening) screen then over a 100 mesh (0.150 mm opening) screen. Granules too large to pass through the 35 mesh screen were diverted to a pulverizer to reduce their size to be within the desired range. Granules passing through the 100 mesh screen were diverted back into the mixer/pelletizer for re-agglomeration.

The granules were partially dried to yield a residual moisture content of 6.5% by heating the granules in a fluid bed dryer at a temperature of 107° C. "Dwell time" in the dryer was approximately 1 minute.

An additional mix, identical in composition to that described above, except that it contained no body stain, was made in a manner similar to that described above.

The partially dried granules of the mixture containing no body stain were transported to a press filler box. In similar fashion, the partially dried granules of the mixture containing the body stain were transported to a second filler box attached to the same press but on a side opposite that to which the first filler box was attached.

The first filler box (containing the mixture having no body stain) was passed over the die cavity to uniformly distribute granules over the entire cavity. The die was lowered and the filler box containing the mixture with body stain was passed over the die cavity to uniformly distribute that mix. The die fill had been pre-set to yield a composite having two layers: the first, with no body stain, constituting the lower two-thirds of the composite; the second, with body stain, constituting the upper one-third of the composite.

The partially dried granules were then subjected to a uniform pressure of about 2.4 tons per square inch in the die cavity to produce a "green" body compact. Compacts were ejected from the die and placed in a mangle dryer (of a type common to the industry) for an approximately 2 hour cycle period. Maximum dryer temperature was 150° C. This process reduced the tile moisture content to a level below 1.0%.

The green body compact was then fired in a roller hearth kiln (maximum temperature 1032° C.), at a schedule equivalent to cone 07, to produce an impervious virgin soda-lime glass-based ceramic tile. (Cooling capacity is an inherent part of the kiln operation.)

The finished impervious virgin soda-lime glass based ceramic tile had the following composition:

| Material | Weight % |
|---|---|
| $SiO_2$ | 69.89 |
| $Al_2O_3$ | 11.75 |
| CaO | 3.53 |
| MgO | 2.47 |
| $Na_2O$ | 11.57 |
| $K_2O$ | 0.23 |
| $Fe_2O_3$ | 0.14 |
| $TiO_2$ | 0.41 |
| $P_2O_5$ | 0.01 |

EXAMPLE II

Using a soda-lime glass having a different oxide composition, an impervious soda-lime glass based article in the shape of a floor tile (nominal dimensions 8"×8"×⅜") was prepared following a method similar to that described in Example I. The virgin soda-lime glass cullet used in this Example had the following composition: 72.62 weight percent $SiO_2$; 1.44 weight percent $Al_2O_3$; 5.67 weight percent CaO; 4.01 weight percent MgO; 15.99 weight percent $Na_2O$; and 0.27 weight percent $K_2O$. The kaolin and flint had the same compositions as those used in Example I.

The finished impervious virgin soda-lime glass based ceramic tile had the following composition:

| Material | Weight % |
|---|---|
| $SiO_2$ | 69.63 |
| $Al_2O_3$ | 11.75 |
| CaO | 3.97 |
| MgO | 2.79 |
| $Na_2O$ | 11.09 |
| $K_2O$ | 0.21 |
| $Fe_2O_3$ | 0.13 |
| $TiO_2$ | 0.42 |
| $P_2O_5$ | 0.01 |

Other impervious soda-lime glass based ceramic articles, manufactured by a method and having compositions in accordance with the present invention, have typical oxide compositions, after firing, comprising 60-75% $SiO_2$; 10-20% $Al_2O_3$; 10-15% $Na_2O$; and lesser amounts, i.e., from about 1-5 weight percent, of each of CaO, MgO, and $K_2O$; and trace amounts (i.e., less than 1 weight percent) of each of $Fe_2O_3$, $TiO_2$, and $P_2O_5$.

Preferably the $Al_2O_3$ content of the finished article is from about 11.75 to about 20 percent by weight.

X-ray diffraction of impervious soda-lime glass based ceramic articles of the present invention reveals a glassy matrix bonding phases of quartz, sodium aluminosilicate, and cristobalite.

Articles prepared in a manner similar to that described in the foregoing Examples in accordance with the present invention exhibited physical properties equal to or surpassing those specified in American National Standard Specifications for Ceramic Tile (ANSI A137.1-1980).

The following Table identifies the particular tests conducted, the ANSI specification, and the results for an article prepared in accordance with the present invention, designated in Table I as "Test Sample".

TABLE I

AMERICAN SOCIETY FOR TESTING AND MATERIALS RESULTS

| TEST | ANSI SPEC. | TEST SAMPLE |
|---|---|---|
| Facial Dimension and Thickness | | |
| Thickness Variation | ±0.020 max. | .004" |
| Out-of-Square | 3.0% max. | 0.40% |
| Wedging | 1.0% max. | 0.488% |
| Wear Resistance Index | 100 min. | 98 |
| Breaking Strength | 250 lbs min. | 295 lbs. |
| Water Absorption | 0.5% max. | 0.007% |
| Slip Resistance (Coeff. of Friction) | 0.50 min. | 0.71 |
| Apparent Porosity | — | 0.01% |
| Indentation Hardness | — | 440 |
| Thermal Shock Resistance | Pass/Fail | Pass |
| Resistance to Freeze-Thaw | Pass/Fail | Pass |
| Glazing Resistance | Pass/Fail | Pass |
| Chemical Resistance | Pass/Fail | Pass |
| Color Permanency | Pass/Fail | Pass |
| Bond Strength | | |
| 7-Day | 200 PSI min. | 212 PSI |
| 28-Day | 200 PSI min. | 304 PSI |

Optionally, the exterior surfaces of the tiles or other shaped articles of the present invention can be glazed with glazes formulated to "fit" the body by known glazing techniques.

In summary, utilization of a precisely controlled virgin soda-lime glass cullet as the principal body constituent, in accordance with the present invention, affords unique process advantages to the impervious glass based ceramic article of this invention.

Because the composition of the virgin soda-lime glass cullet glass can be precisely controlled and rigid process control parameters can be established and maintained, it is not necessary to vary the process to compensate for variations in raw materials, such as naturally-occurring clays or commercial glass cullet.

The mechanical properties of the present impervious soda-lime glass-based ceramic article are derived from the reactivity, at maturing temperature, of the glassy phase with the crystalline phases in the body composition. The virgin soda-lime glass cullet employed in the present invention has a consistent softening temperature (700° C.). Reactivity of such glass with the alumina and free silica in the body as a function of temperature is controllable.

While there has been shown and described what are considered preferred embodiments of the present invention, it will be obvious to those skilled in the art that various changes and modifications may be made therein without departing from the invention as defined by the appended claims.

What is claimed is:

1. A method for making an impervious virgin soda-lime glass-based ceramic article, said method comprising:
   dry-mixing a raw batch mixture comprising virgin soda-lime glass cullet and clay to form raw batch material;
   adding sufficient amount of a liquid to the raw batch while mixing at a sufficient speed to produce pellets of the mixture;
   heating the pellets to remove part of the moisture therefrom to form partially dried pellets;
   uniformly distributing the partially dried pellets in a die cavity;
   uniformly applying pressure to the uniformly distributed partially dried pellets in the die cavity to form a green body compact;
   drying the green body to a moisture content of less than 1 weight percent by weight; and
   firing the dried green body at a temperature and for a period of time sufficient to form said impervious ceramic article.

2. A method in accordance with claim 1 wherein said mixture comprises greater than 60 to about 85 weight percent virgin soda-lime glass cullet, said cullet having an average particle size in the range of from about 100 to about 200 mesh; from about 15 to about 40 weight percent clay, said clay having an average particle size in the range of from about 200 to about 325 mesh; and from about 0 to about 10 weight percent flint, said flint having an average particle size in the range of about 100 to about 200 mesh.

3. A method for making an impervious virgin soda-lime glass-based ceramic tile, said method comprising:
   dry-mixing greater than 60 to about 85 weight percent virgin soda-lime glass cullet, said cullet having an average particle size in the range of from about 100 to about 200 mesh; from about 15 to about 40 weight percent clay, said clay having an average particle size in the range of from about 200 to about 325 mesh; and from about 0 to about 10 weight percent flint, said flint having an average particle size in the range of about 100 to about 200 mesh to form raw batch material;
   adding about 10–15 weight percent water to the raw batch material and while mixing at a speed sufficient to produce pellets of the mixture;
   heating the pellets to remove part of the moisture therefrom to form partially dried pellets having a residual moisture content of about 6–7 weight percent;
   uniformly distributing the partially dried pellets in a die cavity;
   uniformly applying pressure greater than or equal to about 1 ton psi to the uniformly distributed partially dried pellets in the die cavity to form a green body compact;
   drying the green body to a moisture content of less than 1 weight percent by weight; and
   firing the dried green body at a temperature in excess of 1000° C. for a period of time sufficient to form said impervious ceramic tile.

4. A method for making an impervious virgin soda-lime glass-based ceramic tile in accordance with claim 3 wherein said method further comprises applying a glaze to at least one surface of the tile.

5. A method for making an impervious virgin soda-lime glass-based ceramic tile in accordance with claim 3 wherein said raw batch material further includes body stains.

6. A method for making an impervious virgin soda-lime glass-based ceramic tile in accordance with claim 3 wherein said pellets have a particle size in the range of from about 0.15 to 0.50 mm.

* * * * *